US009864754B2

(12) United States Patent
Jiang et al.

(10) Patent No.: US 9,864,754 B2
(45) Date of Patent: Jan. 9, 2018

(54) VIRTUAL DESKTOP INFRASTRUCTURE PRIVATE CLOUD

(71) Applicant: VMware, Inc., Palo Alto, CA (US)

(72) Inventors: Haiou Jiang, Beijing (CN); Dong Wang, Beijing (CN); Feng Yan, Beijing (CN); Ning Yu, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 14/749,950

(22) Filed: Jun. 25, 2015

(65) Prior Publication Data

US 2016/0378782 A1 Dec. 29, 2016

(51) Int. Cl.
*H04L 29/06* (2006.01)
*G06F 17/30* (2006.01)
*G06F 21/62* (2013.01)

(52) U.S. Cl.
CPC .. *G06F 17/30165* (2013.01); *G06F 17/30235* (2013.01); *G06F 21/6209* (2013.01); *H04L 63/083* (2013.01)

(58) Field of Classification Search
CPC ......... G06F 17/30165; G06F 17/30233; G06F 17/30235; G06F 17/30893; H04L 63/083
See application file for complete search history.

(56) References Cited

U.S. PATENT DOCUMENTS

| | | | | |
|---|---|---|---|---|
| 7,624,437 | B1 * | 11/2009 | Fagundo | H04L 12/4641 713/153 |
| 2005/0223047 | A1 * | 10/2005 | Shah | G06F 17/30575 |
| 2008/0104661 | A1 * | 5/2008 | Levin | G06F 21/6218 726/1 |
| 2010/0333179 | A1 * | 12/2010 | Chien | G06F 17/30017 726/4 |
| 2011/0251992 | A1 * | 10/2011 | Bethlehem | H04L 12/2863 707/610 |

(Continued)

OTHER PUBLICATIONS

VMware, Folder Redirection Group Policy Settings, Jan. 23, 2014, https://pubs.vmware.com/view-50/index.jsp?topic=%2Fcom.vmware.view.administration.doc%2FGUID-784A7FB5-033A-4541-A30A-43C9E5D16650.html.*

(Continued)

*Primary Examiner* — Khang Do
(74) *Attorney, Agent, or Firm* — Patterson & Sheridan, LLP

(57) ABSTRACT

Techniques presented herein provide an approach for sharing folders and files across devices. In one embodiment, folder redirection is employed to permit a device running a virtual infrastructure (VDI) client which connects to a remote agent to access folders and files shared by other devices. To enable such folder redirection, a folder redirection management module generates, for each shared folder, a redirection mapping that associates an original folder path with a uniform naming convention (UNC) scheme. When a device attempts to launch a remote desktop in a remote agent using the same username as that associated with other devices that share folders/files, the folder redirection management module transmits redirection mappings for those devices to the remote agent and opens permissions of the corresponding UNC schemes, the remote agent mounts the shared folders as virtual drives, and the shared folders are then accessible through folder redirection based on the redirection mappings.

20 Claims, 4 Drawing Sheets

(56) References Cited

U.S. PATENT DOCUMENTS

| | | | |
|---|---|---|---|
| 2013/0111554 A1* | 5/2013 | Sposato | H04L 63/20 726/4 |
| 2013/0246596 A1* | 9/2013 | Fujiwara | H04L 41/00 709/223 |
| 2014/0289291 A1* | 9/2014 | Khalid | G06F 17/30126 707/828 |

OTHER PUBLICATIONS

VMware View 5.0 Documentation Center. Printed Jun. 25, 2015. "Folder Redirection Group Policy Settings." https://pubs.vmware.com/view-50/index.jsp?topic=%2Fcom.vmware.view.administration.doc%2FGUID-784A7FB5-033A-4541-A30A-43C9E5D16650.html.

Dropbox. Printed Jun. 25, 2015. https://www.dropbox.com/.

* cited by examiner

VIRTUAL DESKTOP INFRASTRUCTURE PRIVATE CLOUD

BACKGROUND

In virtual desktop infrastructures (VDIs), remote desktop operating systems, hosted on virtual machines (VMs) running on centralized servers, are delivered as a managed service to end users via a network. Such centralized and automated management of the virtualized operating system, applications, and user data provides increased control and cost savings.

Some VDI providers support folder/file redirection between client devices and remote desktops, which permits folders in a local operating system (OS) running in a client device to be made available in a remote desktop as a shared folder. A user can then copy files off of the client device to use in the remote desktop, and vice versa, among other things. However, such redirection typically ends when the client device is disconnected from the remote desktop, and client devices can only share folders and files with the remote desktop but not with other client devices. That is, the folder/file redirection is peer-to-peer, allowing folders on a single client device to be shared with the remote agent to which the device connects, but not folder/file sharing between multiple devices.

SUMMARY

One embodiment provides a computer-implemented method for sharing folders and files across computing devices. The method generally includes receiving configuration information indicating folders and files to be shared from one or more computing devices. Further, the method includes generating a redirection mapping for each folder to be shared. In addition, the method includes, upon receiving a request from a first computing device to connect to a remote agent, transmitting the redirection mappings for the folders to be shared to the remote agent. When the first computing device is connected to the remote agent, the shared folders and files therein are accessible via folder redirection based on the redirection mappings.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for sharing folders and files across multiple devices. In one embodiment, folder redirection is employed to permit a device running a virtual infrastructure (VDI) client which connects to a remote agent to access shared folders and files from other connected devices transparently, including across different types of file systems. To enable such folder redirection, a folder redirection management module generates redirection mappings for folders shared by devices authenticated to a connection broker that manages connections between VDI clients and desktops/applications running in remote agents. Such redirection mappings associate original folder paths on the client devices with uniform naming convention (UNC) schemes generated by the redirection management module to describe locations of the shared folders. When a particular device attempts to launch a remote desktop or application in a remote agent using authentication credentials having the same username as that associated with (e.g., used to authenticate) other devices that share folders/files, the folder redirection management module transmits the redirection mappings for those other devices to the remote agent and opens permissions of the corresponding UNC schemes. In turn, the remote agent mounts the shared folders as virtual drives, and the shared folders may then be accessed through folder redirection based on the redirection mappings.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
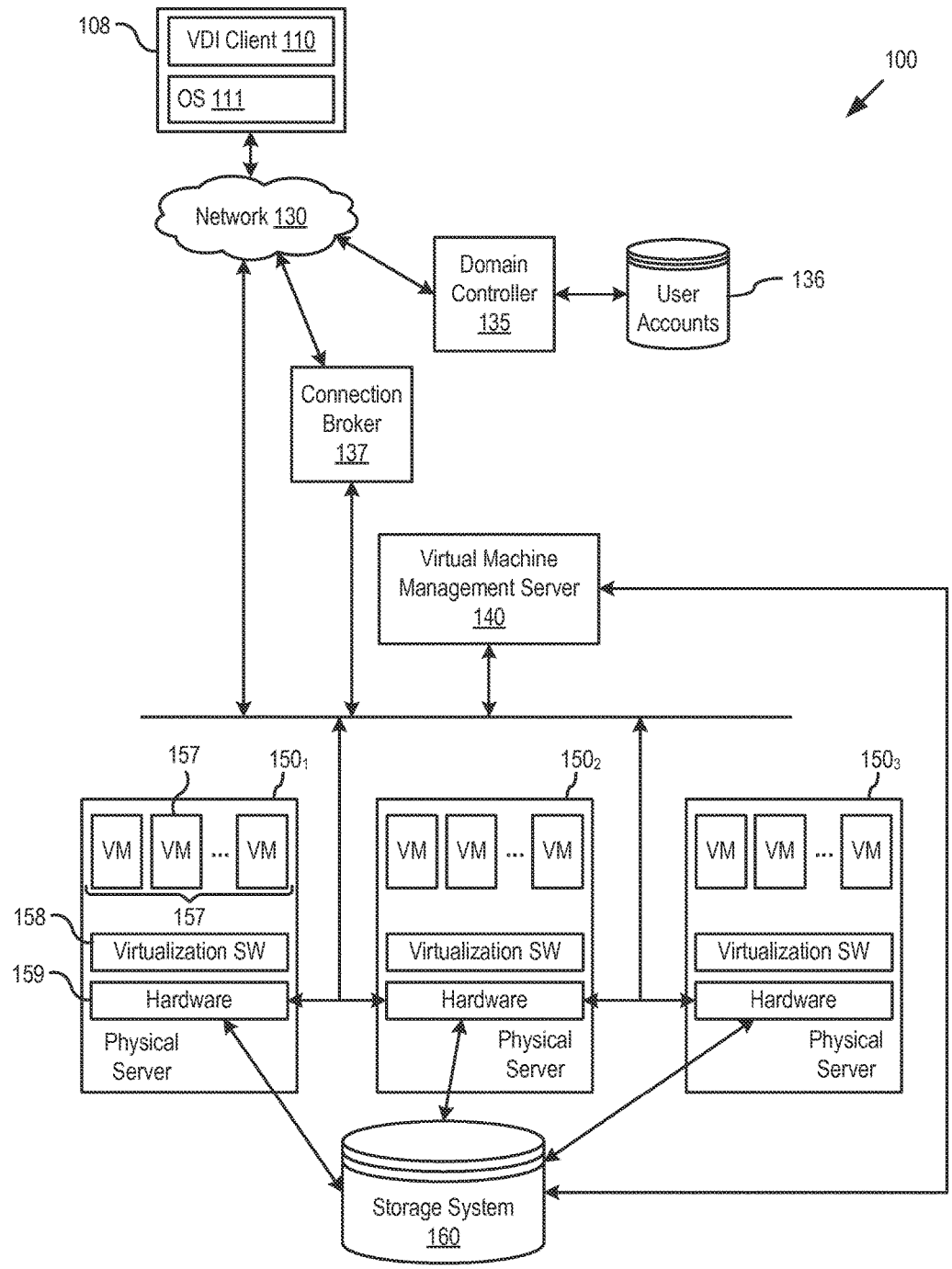
FIG. 1 illustrates components of a virtualized desktop infrastructure system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients provides an interface for the users to access their desktops, which may be running in remote agents that are one of virtual machines (VMs) 157 or blade servers (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 130, from any location, using a general purpose computer running a commodity operating system and a VDI client software program such as VMware® View™, or a special purpose thin client such as those available from Dell, HP, NEC, Sun Microsystems, Wyse, and others. As discussed in greater detail below, users may further access shared folders and files from other devices using the VDI client, i.e., any device running the VDI client is able to access cross-platform folders and files transparently.

VDI system 100 includes a domain controller 135, such as Microsoft® Active Directory®, that manages user accounts 136 including user log-in information, and a connection broker 137 that manages connections between VDI clients and desktops running in VMs 157 or other platforms. Domain controller 135 and connection broker 137 may run on separate servers or in separate VMs running on the same server or different servers. In the embodiments of the present invention illustrated herein, desktops are running in VMs 157 are instantiated on a plurality of physical computers 150, 152, 154, each of which includes virtualization software 158 and hardware 159, is controlled by a VM management server 140, and is coupled to a shared persistent storage system 160.

All of the components of VDI system 100 communicate via network 130. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

In the embodiments described herein, a folder redirection management module (not shown), which is in communication with connection broker 137 or is part of connection broker 137, is configured to receive configuration information indicating folders that are shared from client devices that have been authenticated to connection broker 137. In turn, the folder redirection management module generates and stores folder redirection mappings associating a UNC scheme with the original folder path of each shared folder. The folder redirection mappings may further be associated with the user (e.g., by username) of the connected device which is sharing the folder so that the shared folder is only accessible by the same user.

When a new device connects to connection broker 137 and attempts to launch a remote desktop or application in VM 157, connection broker 137 will notify the folder redirection management module to check whether existing connections with other devices belong to the same username as that used to authenticate the new device. The folder redirection management module may then determine whether any stored redirection mappings for connected devices is associated with the same username as that used to authenticate the new device. If the folder redirection management module identifies such other devices, then the folder redirection management module transmits redirection mappings for those devices to the remote agent and opens permissions of the UNC schemes in the redirection mappings. In turn, the remote agent mounts the shared folders as virtual drives such that the user can open the shared folder and folders/files therein as if the shared folder were a local drive, i.e., the fact that the shared folder is a network resource may be transparent to the user. In particular, the shared folders may be accessed via folder redirection using the redirection mappings, thereby permitting the user to access shared folders from multiple devices of his/hers using the VDI client that is connected to the remote agent. In the case of a remote application, the virtual drives for shared folders may be displayed in, e.g., a pop-up window when the user attempts to open a file using the application.

To ensure that folder redirection is secure, the folder redirection management module may require authentication to connection broker 137 to configure folder redirection settings. In addition, the folder redirection management module may maintain a white list of specific devices with which folders/files are allowed to be shared through folder redirection. In such a case, the folder redirection management module may transmit redirection mappings to the remote agent only if the device launching the remote desktop or application in the remote agent appears in the white list. In another embodiment, sensitive folder/file sharing configurations including the redirection mappings are saved in the folder redirection management module but not in client devices themselves or in the remote agent, as the folder redirection management module only acts after successful authentication to connection broker 137 and connection broker 137 interacts with the folder redirection management module while the client devices and remote agents do not interact with the folder redirection management module. In yet another embodiment, idle session timeout may be employed such that the folder redirection management module makes the shared folders/files inaccessible if the user is idle for more than some configurable amount of time.

Figure 2:
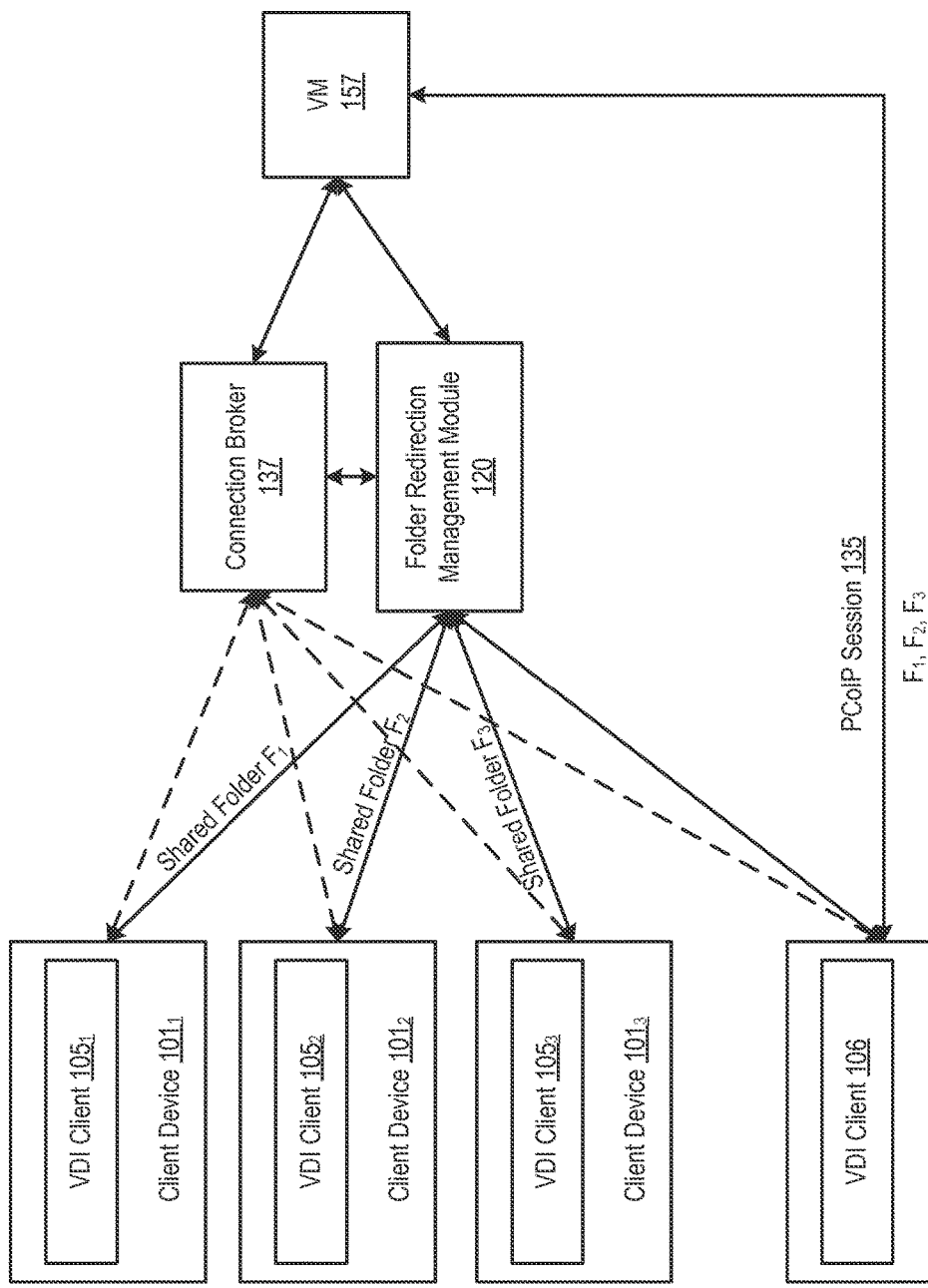
FIG. 2 illustrates an approach for folder and file sharing, according to an embodiment.

FIG. 2 illustrates an approach for folder and file sharing, according to an embodiment. As shown, client devices $101_{1-3}$ running VDI clients $105_{1-3}$ are each connected to connection broker 137 and share folders $F_{1-3}$, respectively. It should be understood that client devices $101_{1-3}$ may run various operating systems (OSes) that use different file systems. Illustratively, another client device $101_4$, which is also connected to connection broker 137 and runs a VDI client 106 that communicates with a remote agent (VM 157) via a remote display protocol (shown as PC over IP (PCoIP) session 135), is able to access each of the folders $F_{1-3}$ through folder redirection. That is, folders/files in different file systems may be made accessible to client device $105_4$ through folder redirection, essentially creating a private cloud distributed over client devices $101_{1-3}$ with shared folders/files that are accessible to client device $105_4$ via the remote agent.

Configuration information indicating the folders/files to be shared, including folder paths, are first transmitted by VDI clients $105_{1-3}$ to a folder redirection management module 120 after client devices $101_{1-3}$ have been authenticated to connection broker 137. Folder redirection management module 120, which is a middle layer between client devices $101_{1-3}$ and remote agent 157, is responsible for generating and storing redirection mappings, for each of the shared folders, that are used in folder redirection. As discussed, the redirection mappings may include associations between the original paths of the shared folders and UNC schemes that folder redirection management module 120 generates for the shared folders. In addition, the folder redirection mappings may be associated with the user of the connected device which is sharing the folder so that the shared folder is only accessible by the same user. The process of generating redirection mappings is akin to redirecting the folders to folder redirection management module 120 itself, except only a redirection mapping is generated and no actual redirection is performed. Table 1 shows an example of redirection mappings of original file paths to UNC schemes, organized in JSON (JavaScript Object Notation) format.

TABLE 1

[{user: "user1",
    devices: [
        {hostname : "myWindow", clientId : "#MAC_ADDR",
        maps : [{oriFilePath : "C:\abc", UNC: "\\vmware-host\C\abc"},
        {oriFilePath : "D:\efg", UNC : "\\vmware-host\D\edf"}]},
        {hostname : "myMac", clientId : "#MAC_ADDR",
        maps: [{oriFilePath : "/home/abc", UNC : "\\vmware-
        host\home\abc"}, {oriFilePath : "/home/efg",
        UNC: "\\vmware-host\home\efg"}]}
    ]
  },
]

When client device $105_4$ then connects to connection broker 137 and requests that a remote desktop or application be launched in remote agent 157, connection broker 137 notifies folder redirection management module 120 to check whether other devices (e.g., client devices $101_{1-3}$) that are currently connected to connection broker 137 are associated with (e.g., have been authenticated using) the same username as that used to authenticate client device $101_4$. As discussed, if such other devices are identified, then folder redirection management module 120 transmits the redirection mappings for folders shared by thosedevices to remote agent 157. In addition, folder redirection management module 120 opens permissions of the UNC schemes in the redirection mappings so that the UNC schemes can be used to access the shared folders. In turn, remote agent 157 mounts the shared folders as virtual drives, and the shared folders and files therein are then accessible via folder redirection based on the redirection mappings. For example, using VDI client 106, a user of client device $105_4$ may double click on one of the virtual drives or a file therein and thereby access the remote folder or file in a similar manner as when accessing the remote folder or file via UNC, with the remotely opened file being a copy of the local file.

Additional security features may be used to ensure that folder redirection is secure. As discussed, such security features may including requiring authentication to connection broker 137 to configure folder redirection settings, maintaining a white list of specific devices with which folders/files are allowed to be shared through folder redirection, saving sensitive folder/file sharing configurations including the redirection mappings in the folder redirection management module but not in client devices themselves or in the remote agent, and employing a idle session timeout such the shared folders/files are made inaccessible if the user is idle for more than some configurable amount of time.

Figure 3:
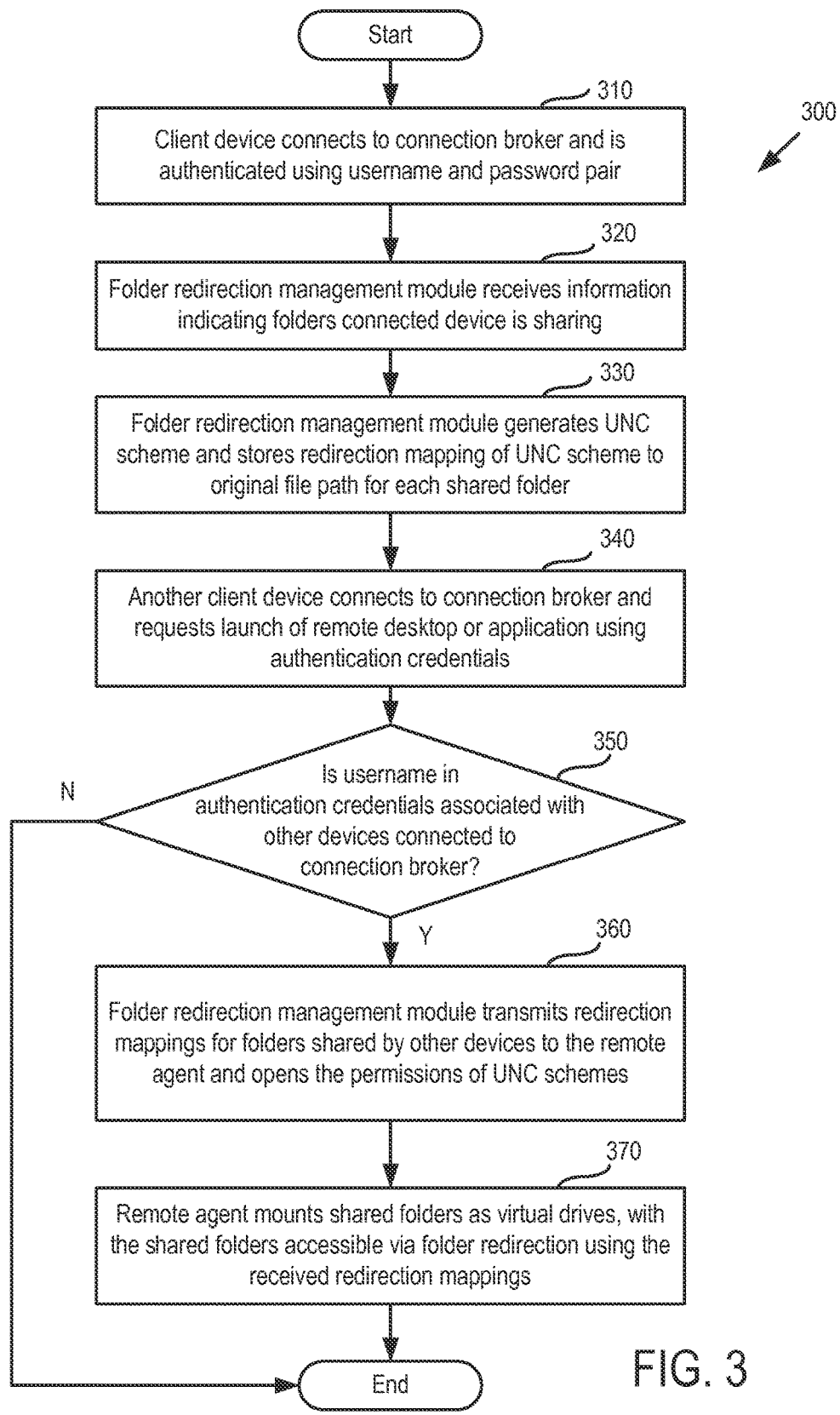
FIG. 3 illustrates a method for sharing folders and files across computing devices, according to an embodiment.

FIG. 3 illustrates a method 300 for sharing folders and files across computing devices, according to an embodiment. As shown, the method 300 begins at step 310, where a client device (e.g., one of client devices $101_{1-3}$) connects to connection broker 137 and is authenticated to connection broker 137 using a username and password pair. It should be understood that the client device may also connect to a remote agent through connection broker 137.

At step 320, file redirection management module 120 receives information indicating folders the connected device is sharing. This assumes that folder redirection is enabled and that the user has configured certain folders and/or files as shared folders/files using a VDI client (e.g., VDI client $105_{1-3}$) or another application. In such a case, the VDI client or other application may transmit configuration information indicating the shared folders, including the folder paths, to connection broker 137, which then forwards such information to file redirection management module 120.

At step 330, file redirection management module 120 generates a UNC scheme and stores a redirection mapping of the UNC scheme to the original file path for each shared folder. Any feasible UNC scheme may be used. For example, the UNC scheme generated for one shared folder may have the form \\vmware-host\XXX. Another example of redirection mappings with UNC schemes and organized in JSON format is shown above in Table 1. Additionally, each of the folder redirection mappings may be associated with the user (e.g., by username) of the connected device which is sharing the folder so that the shared folder is only accessible by the same user.

At step 340, another client device (e.g., client device $105_4$) connects to connection broker 137 and requests to launch a remote desktop or application using certain authentication credentials. At step 350, in response to such a request, connection broker 137 notifies file redirection management module 120 to check whether the authentication credentials include a username matching the username associated with (e.g., used to authenticate) another device which is currently connected to connection broker 137. That is, file redirection management module 120 is asked to check whether the same user has connected to connection broker 137 using another device so that the shared folders and files, if any, of the other device may be made available through redirection. This may be achieved by, e.g., determining whether any redirection mappings are stored for connected devices associated with the same user by username. In addition, if a different client device is already connected to the remote desktop or application that the client device is attempting to connect with, then the existing connection may be terminated.

If file redirection management module 120 determines that the authentication credentials do not include a username associated with other devices currently connected to connection broker 137, then no redirection is necessary. On the other hand, if file redirection management module 120 determines that the username in the authentication credentials matches a username associated with other devices connected to connection broker 137, then at step 360, file redirection management module 120 transmits the redirection mappings for folders shared by the other devices to the remote agent and opens the permissions of the UNC schemes in the redirection maps so that the UNC schemes can be used to access the shared folders.

In one embodiment, file redirection management module 120 may also maintain a white list of specific devices with which folders/files are allowed to be shared through folder redirection for security purposes. In such a case, file redirection management module 120 may only transmit the redirection mappings if the device requesting the launch of the remote desktop or application appears in the white list. As discussed, other security features may include saving sensitive folder/file sharing configurations in the folder redirection management module itself rather than in client devices themselves or in the remote agent, requiring authentication to connection broker 137 to configure folder redirection settings, and employing a idle session timeout such that the shared folders/files are made inaccessible if the user is idle for more than some configurable amount of time.

At step 370, upon receiving the redirection mappings, the remote agent creates virtual drives for the shared folders so that the shared folders may be accessed via folder redirection using the received redirection mappings. As discussed, in such folder redirection, a user of using VDI client 106 may double click on one of the virtual drives or a file therein and access the corresponding remote folder or file in a similar manner as when accessing the remote folder or file via UNC, with the remotely opened file being a copy of the local file. As a result, shared folders from multiple devices, including those with different types of file systems, are made accessible to the client device connected to the remote desktop or application through connection broker 137. As discussed, in the case of a remote application, the virtual drives for shared folders may be displayed in, e.g., a pop-up window when the user attempts to open a file using the application. Thereafter, a user may interact with a VDI client to view/edit files in the shared folders of the multiple devices and move/copy files across the multiple devices.

Figure 4:
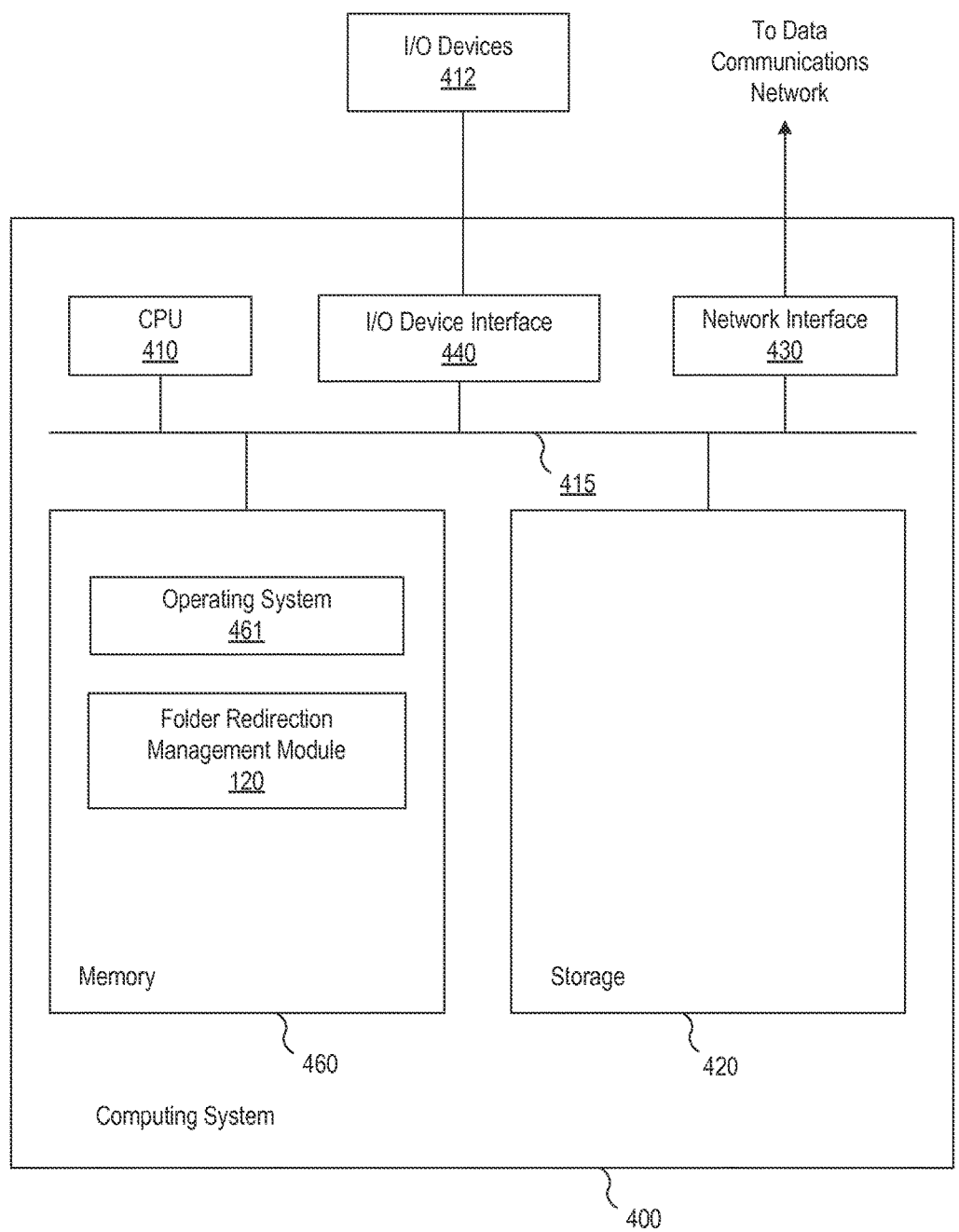
FIG. 4 illustrates a system in which an embodiment may be implemented.

FIG. 4 illustrates a system 400 in which an embodiment may be implemented. As shown, system 400 includes, without limitation, a central processing unit (CPU) 410, a network interface 430, an interconnect 415, a memory 460 and storage 420. System 400 may also include an I/O device interface 440 connecting I/O devices 450 (e.g., keyboard, display and mouse devices) to the system 400.

CPU 410 retrieves and executes programming instructions stored in the memory 460. Similarly, CPU 410 stores and retrieves application data residing in the memory 460. Interconnect 415 facilitates transmission, such as of programming instructions and application data, between CPU 410, I/O device interface 440, storage 420, network interface 430, and memory 460. CPU 410 is included to be representative of a single CPU, multiple CPUs, a single CPU having multiple processing cores, and the like. And memory 460 is generally included to be representative of a random access memory. Storage 420 may be a disk drive storage device. Although shown as a single unit, storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of system 400 shown in FIG. 4 may be distributed across multiple computing systems connected by a data communications network.

As shown, memory 460 includes an operating system 461 and a folder redirection management module 120. Operating system 461 may be, e.g., Linux®. Folder redirection management module 120 is configured to receive configuration information on folders/files to be shared including paths of the shared folders, generate and store redirection mappings for the shared folders, and transmit the stored mappings to a remote agent when a client device attempts to launch a remote desktop or application in the remote agent. In turn, the remote agent may mount the shared folders as virtual drives, and the shared folders may then be accessed through folder redirection using the redirection mappings. In one embodiment, system 400 may be a connection broker server, and folder redirection management module 120 may be a module in such a connection broker. In another embodiment, folder redirection management module 120 may be separate from, but communicate with, such a connection broker.

Although discussed above primarily with respect to a folder redirection management module generating redirection mappings, redirection mappings may be generated by the client devices themselves in another embodiment. In such a case, the folder redirection management module may store only connection information after each device is authenticated to the broker. Then, when another device attempts to launch a remote desktop and is successfully authenticated, the folder redirection management module may identify existing connections of devices belonging to the same user and notify those devices to redirect their shared folders to the connected agent themselves.

Advantageously, techniques disclosed herein permit users to view/edit files on other devices using a VDI client connected to a remote agent. In particular, files and folders in different types of file systems may be shared and accessed from any connected device, thereby providing a private cloud distributed across a user's devices. Further, users may move and copy shared files across devices, with data being stored in the users' own private, trusted devices rather than in a centralized server. The files can be accessed and moved/copied across different devices as if the devices were running identical operating systems with the same file system.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for sharing folders and files across a plurality of client computing devices, which is carried out by a folder redirection management server that is located between the plurality of client computing devices and a virtual machine running on a host server, comprising:

receiving, by the folder redirection management server, configuration information indicating folders and files to be shared from a first client computing device that is authorized to access the virtual machine;

generating, by the folder redirection management server, a redirection mapping for each folder and file to be shared based on the received configuration information; and upon receiving a request from a second client computing device that is authorized to access the virtual machine to connect to the virtual machine, transmitting the redirection mappings for the folders and files to be shared from the folder redirection management server to the virtual machine, wherein, when the second client computing device is connected to the virtual machine, the folders and files to be shared become accessible to the second client computing device through the redirection mappings.

2. The method of claim 1, wherein generating the redirection mapping for each folder and file to be shared includes generating a uniform naming convention (UNC) scheme and associating the UNC scheme to an original folder path, and wherein the method further comprises opening permissions of the UNC schemes for the folders and files to be shared.

3. The method of claim 1, wherein the configuration information is transmitted from the folder redirection management server to the virtual machine after authentication of the second client computing device using an authentication credential that is the same as an authentication credential that is used when the first client computing device connects to the virtual machine.

4. The method of claim 3, wherein the second client computing device is connected to the virtual machine and permitted to access the folders and files to be shared, only if a device identifier (ID) of the second client computing device is in a predefined white list of client computing devices.

5. The method of claim 3, wherein each of the redirection mappings is associated with a user permitted to access the corresponding folder or file to be shared.

6. The method of claim 1, further comprising, disabling access to the folders and files to be shared upon determining that the second client computing device has been idle for more than a predefined amount of time.

7. The method of claim 1, wherein the folder redirection management server is implemented inside, or is in communication with, a connection broker that manages connections between the plurality of client computing devices and the virtual machine.

8. The method of claim 1, wherein an operating system and a file system of the first client computing device are different from an operating system and a file system of the second client computing device, respectively.

9. A non-transitory computer-readable storage medium containing a program which, when executed by one or more processors of a server, performs operations for sharing folders and files across a plurality of client computing devices connected to the server, the operations comprising:

receiving configuration information indicating folders and files to be shared from a first client computing device that is authorized to access a virtual machine that is running on a host computing device connected to the server;

generating a redirection mapping for each folder and file to be shared based on the received configuration information; and upon receiving a request from a second client computing device that is authorized to access the virtual machine to connect to the virtual machine, transmitting the redirection mappings for the folders and files to be shared from the server to the virtual machine, wherein, when the second client computing device is connected to the virtual machine, the folders and files to be shared become accessible to the second client computing device through the redirection mappings.

10. The non-transitory computer-readable storage medium of claim 9, wherein generating the redirection mapping for each folder and file to be shared includes generating a uniform naming convention (UNC) scheme and associating the UNC scheme to an original folder path, and wherein the operations further comprise opening permissions of the UNC schemes for the folders and files to be shared.

11. The non-transitory computer-readable storage medium of claim 9, wherein the configuration information is transmitted from the server to the virtual machine after authentication of the second client computing device using an authentication credential that is the same as an authentication credential that is used when the first client computing device connects to the virtual machine.

12. The non-transitory computer-readable storage medium of claim 11, wherein the second client computing device is connected to the virtual machine and permitted to access the folders and files to be shared, only if a device identifier (ID) of the second client computing device is in a predefined white list of client computing devices.

13. The non-transitory computer-readable storage medium of claim 11, the operations wherein each of the redirection mappings is associated with a user permitted to access the corresponding folder or file to be shared.

14. The non-transitory computer-readable storage medium of claim 9, the operations further comprising, disabling access to the folders and files to be shared upon determining that the second client computing device has been idle for more than a predefined amount of time.

15. The non-transitory computer-readable storage medium of claim 9, wherein the server is implemented inside, or is in communication with, a connection broker that manages connections between the plurality of client computing devices and the virtual machine.

16. The non-transitory computer-readable storage medium of claim 9, wherein an operating system and a file system of the first client computing device are different from an operating system and a file system of the second client computing device, respectively.

17. A system, comprising:

a processor; and a memory, wherein the memory includes a program executable in the processor to perform operations for sharing folders and files across a plurality of client computing devices connected to the system, the operations comprising:

receiving configuration information indicating folders and files to be shared from a first client computing device that is authorized to access a virtual machine that is running on a host computing device connected to the system, generating a redirection mapping for each folder and file to be shared based on the received configuration information, and upon receiving a request from a second client computing device that is authorized to access the virtual machine to connect to the virtual machine, transmitting the redirection mappings for the folders and files to be shared from the system to the virtual machine, wherein, when the second client computing device is connected to the virtual machine, the folders and files to be shared become accessible to the second client computing device through the redirection mappings.

18. The system of claim 17, wherein generating the redirection mapping for each folder and file to be shared includes generating a uniform naming convention (UNC) scheme and associating the UNC scheme to an original folder path, and wherein the operations further comprise opening permissions of the UNC schemes for the folders and files to be shared.

19. The system of claim 17, wherein the configuration information is transmitted from the system to the virtual machine after authentication of the second client computing device using an authentication credential that is the same as an authentication credential that is used when the first client computing device connects to the virtual machine.

20. The system of claim 17, wherein the system is further configured to manage connections between the plurality of client computing devices and the virtual machine.

* * * * *